Figure 1:
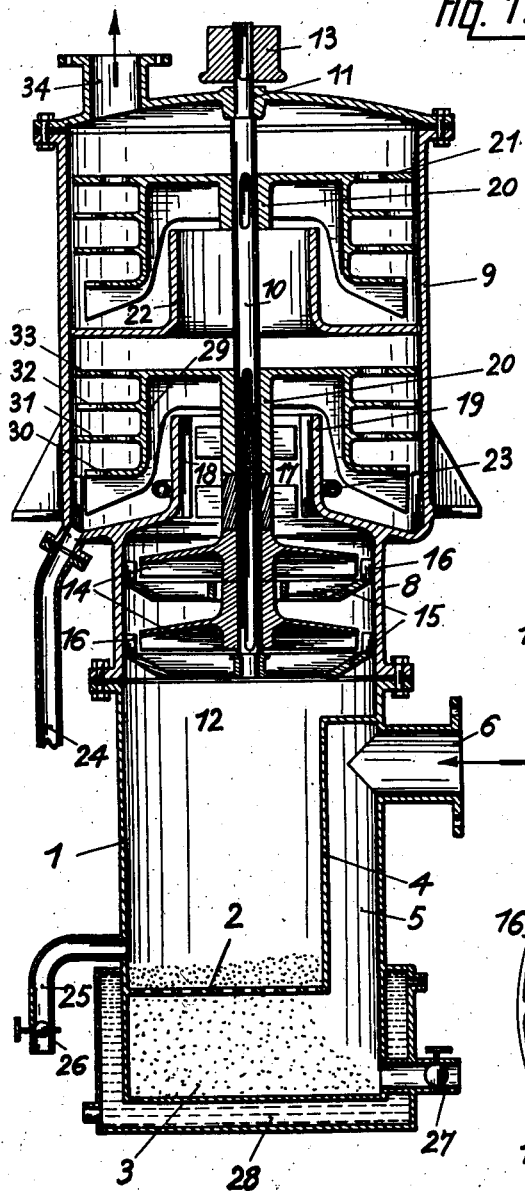

Nov. 17, 1925.

B. MOSCOVITCH

TAR SEPARATOR

Filed Oct. 18, 1924

1,562,118

Inventor
B. Moscovitch
By Markes Clerk
Attys.

Patented Nov. 17, 1925.

1,562,118

UNITED STATES PATENT OFFICE.

BERNARD MOSCOVITCH, OF RODENKIRCHEN-COLOGNE, GERMANY, ASSIGNOR TO "LIGNOJEN" MASCHINEN- UND APPARATEBAU G. M. B. H., OF BERLIN, GERMANY.

TAR SEPARATOR.

Application filed October 18, 1924. Serial No. 744,437.

*To all whom it may concern:*

Be it known that I, BERNARD MOSCOVITCH, a citizen of the Kingdom of Bulgaria, residing at Rodenkirchen-Cologne, Germany, Blucherstrasse 12, have invented new and useful Improvements in Tar Separators, of which the following is a specification.

This invention has reference to tar separators of improved construction and manipulation, and which are particularly adapted for the purification of gas from producers, and it is an important object of this invention to effect a perfect purification of the gas produced, so that the gas is delivered to the point of consumption or operation, a suction-gas-engine for instance, in a condition in which the tar contents have been entirely removed. By the tar separating means according to this invention it becomes possible to employ any kind of low grade fuel, such as lignite, brown coal or the like for the feeding of producers and the like which heretofore could only be operated by employing anthracite and other high grade coal.

This object is accomplished by causing the gas issuing from the producer, after having been freed in any suitable manner from the bulk of dust and ashes, to pass through the tar eliminating means where it is most vigorously mixed by movable and stationary means in such a manner that a complete separation of tar is produced. Upon its introduction into the purifying means the gas is submitted to the action of a suitable chemical compound adapted to produce a very thorough preliminary purification of the gas. The movable means referred to may comprise vanes and bell-shaped structures mounted upon a common shaft. The vanes, blades or the like are adapted to be moved within grate shaped structures in such a manner that a frequent and sudden change of direction is imparted to the gas, whereby the separation of tar is induced. Provision may also be made in the interior of the tar separator of a sprinkler or shower apparatus which removes the last traces of tar and at the same time effects the cooling of the gas.

The eliminated tar settles to the bottom, and accumulates in a collecting vessel provided for the purpose from which it may be run off according to requirements. Any other impurities existing and separated along with the tar will separate out according to their specific gravities, so that those impurities will descend, while the specifically lighter tar floats on top. The tar thereby obtained contains all valuable constituents and is of a comparatively high degree of purity.

Upon the accompanying drawing an apparatus is shown by way of exemplification of the principles of the invention, without, however, restricting the invention to any particular form of apparatus.

Figure 2:
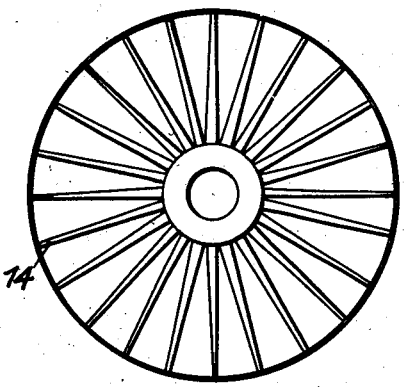
Figure 3:
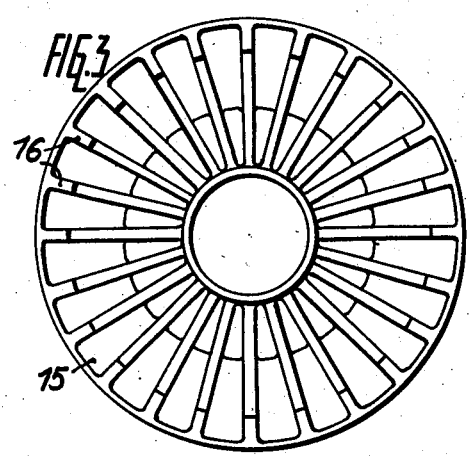

In the drawings:—Figure 1 is a longitudinal section; Figure 2 is a plan view of the vanes seen from below; Figure 3 is a plan view of the grates, seen from below.

The tar separator comprises the lower cylindrical vessel 1 which is divided by a strainer or perforated partition 2 into two compartments the lower one 3 of which contains some chemical compound for the preliminary purification, for instance as a solution. A partition 4 forms a passage 5 for the introduction of the producer gas, the said passage terminating in a tubular projection or a nipple 6. Upon the section 1 another cylindrical part 8 is mounted which is upwardly enlarged, forming the section 9. Within this upper part a shaft 10 is mounted in the bearings 11 and 12 and provided with a pulley 13. Upon this shaft 10 vanes 14 are mounted adapted to be moved within the grate shaped members 15. These grate shaped parts 15 are provided with projections 16 opposite to the outer edges of the vanes 14. The grates 15, 16 are secured to the wall of the cylinder 8. Upon the shaft 10 the vane shaped or blade-like members 17 are keyed opposite to the ribs 18 which are secured to a bell shaped member 19 which is open at the top. To the shaft 10 there are moreover keyed the bell shaped vanes 20, possessing a cylindrical exterior wall provided with horizontal portions 21 which extend into the close proximity of the wall 9. Between the two vanes 20 a bell shaped member 22 is arranged which is secured to the wall 9. At 23 a sprinkler or shower device is provided, and 24 is a discharge pipe for the water introduced thereby into the apparatus. 25 is the delivery pipe for the tar which may be closed by a stop cock 26, and 27 is the discharge tube for the purification liquid which may also be provided with any suitable closing means. 28 indicates the filling for a water jacket, adapted to keep the temperature of the lower chamber at about 80 degrees centigrade. For heating purposes the waste gases of the engine may for instance be employed.

The operation of the device is substantially as follows:—The gas, after having been deprived of the main part of the dust and of the ashes, enters through the tube 6 into the tar separator and into the compartment 3 containing a chemical compound for the preliminary purification. Through the sieve or strainer 2 the gas ascends and fills the space below the vanes 14 completely. By means of the movement of this vane upon the operation of the shaft 10 the gas is projected with great vehemence against the ribs 16 of the grate. As a result thereof the gas undergoes sharp and sudden changes of direction of movement, and in consequence thereof and by the ensuing blows and impinging action the elimination of a considerable portion of the tar is produced. After the gas has also been acted upon by the lower vane 14, the same procedure is repeated at the second vane 14 and on the grates corresponding thereto. Upon continuing its upward movement the gas is submitted to the action of the vanes 17 which throw it likewise with great vehemence against the ribs 18, thereby producing an additional sharp deviation of the direction of movement. By this means the tar is substantially completely separated out. The gas, having thus been freed from the tar then escapes through the upper opening of the bell 19, and arrives below the rotating wings carrying bell 20. By means of the wall 29 it is deflected downwards, until it arrives upon the lowest rib 30. Through these ribs or between them and the outer cylindrical wall the gas will then flow upwards. The ribs 31, 32, 33 are so arranged that at those points where one of the ribs is provided with orifices or ports an uninterrupted surface exist in the following rib, so that by this means also the gas is compelled to change its direction continuously. Underneath the vane carrying bell the sprinkler 23 effects the removal of the last remaining residues of tar, and the gas is cooled at the same time. After the gas has passed through the lower vanes of the bell 20 it flows into the stationary bell 22 with open top, and thence into the second bell 20 with vanes, and after having passed therethrough it flows through the exit tube 34 into the engine or may be conducted to any other source of consumption. At the tubular projection 34 an aspirating action takes place by means of which the gas is sucked through the entire apparatus. Besides, the rotating vanes act as propelling means for the gas. The ribs or vanes of the upper bell 20 are of the same construction as those of the lower bell.

It has been ascertained by experiments that with the apparatus described it is possible to effect such a thorough purification of the producer gas obtained from substances of comparatively low value and of a high contents of tar, such as brown coal, lignite, wood and the like that it may be employed for any and all purposes where purity is of special importance. With the gas purified in this manner it is not only possible to operate engines, but there is also the possibility of utilizing it for the heating of incandescent mantles, and for illuminating purposes generally. It is also a point of great economical importance in connection with the tar separator described that the tar is obtained in the pure and directly available condition, so that by this means considerable amounts of tar become available for which heretofore there was no practical possibility of utilization.

It should be pointed out that the invention has been described in its broad aspects only and that it is not restricted to any particular form of apparatus, but changes and modifications may occur to meet the various requirements of use, and without deviating from the spirit of the invention, as set forth in the appended claims.

I claim:—

1. A tar separator comprising a casing, a plurality of grate members in the casing, and a plurality of inter-connected vane disk members and bell-like members arranged in the casing, certain of said members being movable relatively to the others, each vane disk member cooperating with one of the grate members and comprising an imperforate body with vanes extending therefrom in the direction of the axis of rotation into close proximity to the bars of the grate member with which it is associated, and gas admitting and discharging means on said casing.

2. A tar separator comprising a casing, a plurality of grates and a plurality of inter-connected vanes and nested bell-like structures movable relatively to each other, gas admitting and discharging means on said casing, one of the bell-like structures being stationary and another being movable relatively thereto, and sprinkling means in the casing intermediate the last mentioned bell-like structures.

3. In a tar separator, a casing having an inlet and an outlet, a grate member in the casing between the inlet and the outlet, an imperforate disk member provided with vanes extending toward the grate member, one of said members being rotatable relatively to the other, and the grate member being provided with spaced projections arranged opposite the outer edges of said vanes, both of said members being located in the casing between the inlet and the outlet in order to violently agitate gas moving past the same.

4. In a tar separator, a stationary substantially cylindrical casing, a cover at one end thereof, a wheel-like partition in the casing and spaced from the cover, a rotatable shaft axially disposed between the cover and the partition, upwardly opening bell-shaped members surrounding the shaft, one of said members extending in to the partition, vanes rotatable with the shaft, and grates arranged in close proximity to the vanes and cooperating with the latter to agitate gas passing through the casing.

5. In a tar separator, a stationary cylindrical casing, a rotary shaft longitudinally disposed in the casing, vanes on the shaft and imperforate bells with open bottoms also on said shaft, and perforated staggeredly apertured ribs on the exterior of the bells, upwardly opening bells on the inner walls of the casing extending into and spaced from the first mentioned bells, and gas admitting and discharge means on the casing.

6. In a tar separator, a stationary cylindrical casing, a rotary axially disposed shaft in the casing, spaced superposed grate sections in the casing, partitions between said sections, marginal projections on the sections arranged at the edges of the partitions, vanes on said partitions and movable with the shaft, and cooperating bell-shaped structures on the casing and on the shaft adapted to deflect gas passing through the casing and to agitate the same.

7. In a tar separator for gas treatment in combination, a substantially cylindrical casing, gas admitting and gas educting means on said casing, a rotatable axially disposed shaft in the casing, stationary bells with open top on the inside of the casing, and bells with closed top on the shaft alternating with the first mentioned bells, ribs on the exterior of said stationary bells, rotatable vanes on said shaft, and sprinkling means between the stationary and the rotatable bells.

8. A tar separator including a casing, spaced stationary grates arranged in said casing and having spaced projecting members, rotatable disks cooperating with said grates and having vanes projecting axially toward the grates and having their outer edges arranged in close proximity to said spaced projecting members, each disk having a hub portion extending in the same direction as its vanes so as to form pockets between the vanes.

9. In a tar separator, a casing provided with an internal annular projection, a rotatable imperforate wheel having an imperforate skirt surrounding and spaced from said projection, said wheel being provided with spaced outwardly extending ribs having apertures to permit the passage of gas, and means between the projection and said wheel for sprinkling liquid on to the gas passing between said projection and wheel.

10. In a tar separator, a casing having upper, lower and intermediate sections, an angular partition arranged in the lower section and dividing the same into an upper chamber and a communicating lower chamber and downwardly extending passageway, means in said partition to permit gas to flow through the lower portion of the same, a gas inlet arranged at the upper portion of said passageway, a tar outlet arranged to discharge tar from the upper chamber at a point slightly above the lower portion of the partition, a gas outlet communicating with the upper section of the casing and agitating means arranged in the upper and intermediate section.

11. A tar separator as claimed in claim 10 in which the agitating means arranged in the intermediate section of the casing includes stationary grates and rotatable imperforate vane wheels arranged in close proximity to the grates.

12. A tar separator as claimed in claim 1 in which the casing is provided at its lower portion with means for maintaining the lower portion at approximately 80° C.

In testimony whereof I have signed my name to this specification.

BERNARD MOSCOVITCH.